United States Patent Office 3,245,923
Patented Apr. 12, 1966

3,245,923
CELLULAR POLYURETHANE STABILIZED WITH A LEAD DIALKYLDITHIOCARBAMATE AND PROCESS FOR PREPARING SAME
Anthony S. Manzella, Croton-on-Hudson, N.Y., and John E. Hyre and Deward C. Blue, South Charleston, W. Va., assignors to Union Carbide Corporation, a corporation of New York
No Drawing. Filed May 11, 1962, Ser. No. 194,165
3 Claims. (Cl. 260—2.5)

The invention relates to improved polyols and to the improved polyurethanes which are prepared therefrom. In one aspect, the invention relates to a process for improving polyols such that the polyurethane foams produced therefrom exhibit more desirable physical properties. In another aspect, the invention relates to the improved polyols which are produced by the process of the invention, and to the improved polyurethane foams which are prepared therefrom.

Flexible polyurethane foams can be defined generally as being expanded cellular elastomers formed by the reaction of an organic polyisocyanate and a polyol in the presence of a blowing agent (e.g., water), wherein the elastomer forming the cell junctures and walls is flexible, and in which the cells are predominantly open, for example, up to about 95% and more of the individual cells having two or more open faces.

The load-bearing capacity of a conventional flexible polyurethane foam normally increases by a small, but significant, increment upon curing at temperatures in the vicinity of 70–80° F. The ultimate load-bearing capacity of a flexible polyurethane foam, which is usually attained after about 24 hours at these temperatures, can threfore be predicted by determining the "green strength" of the foam. (By the expression "green strength" is meant the load bearing capacity of a flexible foam tested within about 1 hour after foaming.) It has been observed that some flexible polyurethane foams do not exhibit the above-described small increase in load-bearing capacity when they are cured under relatively humid conditions, and indeed, a decrease in load-bearing capacity is sometimes observed when the foams are cured under these humid conditions.

In accordance with the present invention, it has been discovered that the addition of small amounts of one or more of certain metal dihydrocarbyldithiocarbamates to the polyol employed to prepare flexible polyurethane foam not only prevents loss of load-bearing capacity upon curing under humid conditions, but also acts to give a higher ultimate load-bearing capacity upon curing under relatively dry conditions.

The metal dihydrocarbyldithiocarbamates which have been found to be useful in the present invention can be represented by Formula I (I) 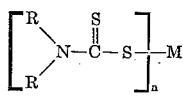

wherein each R individually can be alkyl, aryl, alkaryl, or aralkyl, wherein $n$ represents an integer having a value in the range of from 2 to 4, and wherein M represents a metal having a valence of $n$, said metal being of the group consisting of manganese, iron, cobalt, nickel, copper, zinc, cadmium, mercury, lead, tin, arsenic, antimony, and bismuth. The preferred dithiocarbamates are the divalent zinc, lead, and cadmium dialkyldithiocarbamates, and the most preferred dithiocarbamates are the divalent lead dialkyldithiocarbamates.

The dithiocarbamates contemplated can be produced by procedures which are conventional in the art. For example, the appropriate dihydrocarbylamine, for instance, diamylamine, can be reacted with carbon disulfide to prepare the corresponding dihydrocarbyldithiocarbamic acid. The acid can then be reacted with the appropriate metal hydroxide to produce the desired dithiocarbamate. Commonly, the reactions with carbon disulfide and metal hydroxide are carried out in a one-step process.

Illustrative dihydrocarbyldithiocarbamates which can be employed either singly or in combination include, among others, manganese dibutyldithiocarbamate, ferrous diphenyldithiocarbamate, ferric tolylmethyldithiocarbamate, cobalt dibenzyldithiocarbamate, nickel diethyldithiocarbamate, cupric di(2-ethylhexyl)dithiocarbamate, zinc diamyldithiocarbamate, zinc dimethyldithiocarbamate, zinc dioctyldithiocarbamate, zinc didecyldithiocarbamate, cadmium diamyldithiocarbamate, cadmium dioctyldithiocarbamate, cadmium diisopropyldithiocarbamate, mercuric diphenyldithiocarbamate, stannous dibutyldithiocarbamate, stannic diamyldithiocarbamate, plumbous dimethyldithiocarbamate, plumbous diethyldithiocarbamate, plumbous diisopropyldithio carbamate, plumbous diamyldithiocarbamate, plumbous dihexyldithiocarbamate, plumbous dioctyldithiocarbamate, plumbous didecyldithiocarbamate, plumbous diphenyl dithiocarbamate, plumbic diamyldithiocarbamate, arsenous dibutyldithiocarbamate, antimony diamyldithiocarbamate, bismuth dibenzyldithiocarbamate, and the like.

It is in general desirable that the hydrocarbyl moieties of the metal dihydrocarbyldithiocarbamates have not more than 10 carbon atoms, although dithiocarbamates which contain hydrocarbyl moieties having more than 10 carbon atoms can be employed if desired.

In the preparation of polyurethane foams in accordance with the present invention, the metal hydrocarbyldithiocarbamates are employed in admixture with one or more polyols. The polyols employed preferably contain major amounts of polyoxyalkylene polyols which have from 2 to 3 alcoholic hydroxyl groups, and wherein the oxyalkylene moieties thereof have from 2 to 4 carbon atoms and preferably 3 carbon atoms. The polyoxyalkylene polyols contemplated can be illustrated by the ethylene oxide, 1,2-epoxypropane, and the vicinal epoxybutane adducts of ethylene glycol, propylene glycol, 1,3-dihydroxybutane, 1,4-dihydroxybutane, 2-methyl-2-ethyl-1,3-propanediol, 1,5-dihydroxypentane, 2-ethylhexanediol-1,3, glycerol, 1,2,4-trihydroxybutane, 1,2,6-trihydroxyhexane, 1,1,1-trimethylolethane, 1,1,1-trimethylolpropane, and the like.

The polyol can also contain other polyols, preferably in minor amounts (i.e., less than 50 weight percent of the polyol), for example, polyhydroxyalkanes, trialkanolamines and alkylene oxide adducts thereof, alkylene oxide adducts of mono- and polyamines, alkylene oxide adducts of non-reducing sugars and non-reducing sugar derivatives, alkylene oxide adducts of polyphenols, and the like. Specific examples of such polyols include, among others, ethylene glycol, propylene glycol, and other glycols, glycerol, 1,2,6-trihydroxyhexane, and other trihydroxyalkanes, pentaerythritol, sorbitol, triethanolamine, triisopropanolamine, the tributanolamines, and the alkylene oxide adducts of the above-exemplified trialkanolamines wherein the oxyalkylene moieties thereof have from 2 to 4 carbon atoms, and the like. Additional polyols which can be mentioned include the alkylene oxide adducts of various amines such as methylamine, propylamine, benzylamine, aniline, the toluidines, benzylamine, ethylenediamine, diethylenetriamine, 1,3-butanediamine, 1,6-hexanediamine, phenylenediamines, toluenediamines, naphthalenediamines, and others, wherein preferably the oxyalkylene moieties thereof have from 2 to 4 carbon atoms. Another class of polyols which can be employed include the ethylene oxide, propylene oxide, and butylene oxide adducts of polyphenols such as 2,2-bis(4-hydroxyphenyl)propane, bis(4-hydroxyphenyl)methane, phenol-formaldehyde condensation products, specifically the novolac resins, condensation products of various phenols and acrolein, the simplest members of this class being the 1,1,3-tris(hydroxyphenyl)propanes, condensation products of various phenols and glyoxal, glutaraldehyde, and other dialdehydes, the simplest members of this class being the 1,1,2,2-tetrakis(hydroxyphenyl)ethanes, and the like. A still further useful class of polyols includes the ethylene oxide, propylene oxide, and butylene oxide adducts of non-reducing sugars such as sucrose, and of non-reducing sugar derivatives such as the alkyl glycosides and polyol glycosides, for example, methyl glucoside, ethyl glucoside, ethylene glycol glucoside, propylene glycol glucoside, glycerol glycoside, 1,2,6-hexanetriol glucoside, and the like.

From the foregoing discussion, it is seen that a wide variety of polyols and polyol combinations can be employed in the invention. In general, however, it is desirable that the polyol employed have a hydroxyl number in the range of from about 25 to about 1000, preferably from about 30 to about 500, and most preferably from about 35 to about 90. The hydroxyl number of a polyol is defined as being the number of milligrams of potassium hydroxide necessary to fully hydrolyze the acetylated derivative of 1 gram of polyol (ordinarily phthalic anhydride is employed for the acetylation). The hydroxyl number can also be calculated from the equation $$OH = \frac{1000 \times 56.1 \times f}{M.W.}$$

OH = hydroxyl number of the polyol,
$f$ = functionality of the polyol, that is, average number of hydroxyl groups per molecule.
M.W. = molecular weight of the polyol.

The metal dihydrocarbyldithiocarbamates are employed in the polyol in small amounts, for example, from about 100 parts by weight of the metal compound per million parts by weight of polyol (hereinafter referred to as p.p.m.) to about 1500 p.p.m., preferably from about 250 to about 1200 p.p.m., and more preferably from about 500 p.p.m. to about 1100 p.p.m. When 2 or more of the metal compounds are employed, it is desirable that each one used be present in quantities of at least 100 p.p.m., although this is not essential as long as the total amount of the metal compounds used falls within the general limits described above.

In preparing the flexible polyurethane foams encompassed within the invention, the polyol mixture is reacted with an organic polyisocyanate. The organic polyisocyanates which can be employed include, among others, 2,4- and 2,6-tolylene diisocyanates, phenylene diisocyanates, durylene diisocyante, bis(4-isocyanatophenyl)methane, hexamethylene diisocyanate, xylylene diisocyanates, 3,10-diisocyanatotricyclo[5,2,1,0$^{2,6}$]decane, and polyisocyanates listed in the publication of Siefken, Annalen 562, pages 122–135 (1949). Other polyisocyanates of particular interest are those obtained by reacting aromatic amines with formaldehyde and phosgenation of the resulting condensation products as described in U.S. Patent Nos. 2,683,730 and 3,012,008. The preferred organic polyisocyanates are the aromatic diisocyanates, and more preferred, the tolylene diisocyanates.

The amount of organic polyisocyanate employed is dependent, in part, upon such factors as the nature of the reactants, the end-use intended for the foamed product and the like. In general, however, the total isocyanate equivalent to total reactive hydrogen equivalent (i.e., total equivalent of alcoholic hydroxyl plus water, if water is employed in the reaction mixture) is ordinarily such as to provide enough isocyanate equivalents to react with all reactive hydrogen equivalents present. Preferably, the ratio of isocyanate equivalents to reactive hydrogen equivalents is about 1.0 to 1.1 —NCO equivalents per reactive hydrogen equivalent.

The foaming operation is preferably effected by the one-shot technique, although the quasi-prepolymer technique can also be employed if desired.

Foaming can be accomplished by employing a small amount of water in the reaction mixture (for example, from about 0.5 to about 5 weight percent of water, based upon total weight of the reaction mixture), or through the use of blowing agents which are vaporized by the exotherm of the reaction, or by a combination of the two methods. All of these methods are known in the art. Illustrative blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2 - trichloro - 1,2,2 - trifluoromethane, hexafluorocyclobutene, octafluorocyclobutane, and the like. Another useful class of blowing agents includes thermally-unstable compounds which liberate gases upon heating, such as N,N' - dimethyl - N,N' - dinitrosoterephthalamide, and the like. The generally preferred method of foaming for producing flexible foams is the use of water or a combination of water plus a fluorocarbon blowing agent such as trichloromonofluoromethane. The quantity of blowing agent employed will vary with factors such as the density desired in the foamed product. In general, however, it may be stated that for 100 grams of reaction mixture containing an average NCO/OH ratio of about 1:1, about 0.005 to 0.3 mole of gas are used to provide densities ranging from 30 to 1 pound per cubic foot respectively. The exact amount of blowing agent used can be determined by routine laboratory experimentation.

Catalysts are ordinarily employed in the reaction mixture for accelerating the isocyanate-reactive hydrogen reaction. Such catalysts include a wide variety of compounds such as, for example:

(a) Tertiary amines such as trimethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo-[2,2,2]octane, and the like;

(b) Salts of organic carboxylic acids with a variety of metals such as alkali metals, alkaline earth metals, Al, Sn, Pb, Sb, Mn, Co, Ni, and Cu, some of the more important of such salts being, for instance, stannous octoate, stannous acetate, stannous oleate, lead octoate, metallic driers such as manganese and cobalt naphthenate, sodium acetate, potassium laurate, calcium hexanoate, and the like;

(c) Organometallic derivatives of tetravalent tin, trivalent and pentavalent As, Sb, and Bi, and metal carbonyls of iron and cobalt. Among the organotin compounds that deserve particular mention are dialkyltin salts of carboxylic acids, for example, dibutyltin dilaurate, dibutyltin diacetate, dibutyltin maleate, dilauryltin diacetate, dioctyltin diacetate, dibutyltin bis(4-dimethylaminobenzoate), dibutyl bis(6-methylaminocaproate), and the like. Also, trialkyltin hydroxides, dialkyltin dialkoxides, and dialkyltin dichlorides can be used.

(d) Other classes of compounds which can be used include tertiary phosphines, alkali and alkaline earth metal hydroxides, alkoxides, and phenoxides, acidic metal salts of strong acids, chelates of various metals, alcoholates and phenolates of various metals, and the like.

The tertiary amines may be used as primary catalysts for accelerating the isocyanate-reactive hydrogen reaction, or as secondary catalysts in combination with the above-noted metal catalysts, in particular, the stannous salts of carboxylic acids or the organometallic tin derivatives. Metal catalysts, or combinations thereof, can also be used as the sole catalysts. The catalysts are employed in small amounts, for example, from about 0.001 weight percent to about 5 weight percent, based on weight of the reaction mixture.

It is also within the scope of the invention to employ small amounts, e.g., about 0.001 percent to 5.0 percent by weight, based on the total reaction mixture, of an emulsifying agent such as a polysiloxane-polyoxyalkylene block copolymer having from about 10 to 80 percent by weight of siloxane polymer and from 90 to 20 percent by weight of alkylene oxide polymer, such as the block copolymers described in U.S. Patents 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. The non-hydrolyzable copolymers generally contain from 5 to 95 weight percent, and preferably from 5 to 50 weight percent, of polysiloxane polymer with the remainder being polyoxyalkylene polymer. The non-hydrolyzable copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer.

In one preferred embodiment of the invention, the polyols employed also contain a small amount of an antioxidant. The antioxidants which can be employed are known in the art, and include such compounds as 4-methyl-2,6-di-t-butylphenol, tartaric acid, t-butylcatechol, catechol, diphenyl phosphite, trimethylamine borane, 3-mercapto-1,2-propanediol, thiourea, poly(thiadiazoyltrisulfide)orthoaminobenzenethiol, 2,3 - dimercaptopropanol, mercaptoethanol, malic acid, 1,10-dimercaptododecane, nitrilotriacetic acid, diphenylthiourea, dodecylmercaptan, and the like. The preferred antioxidants are the various phenolic compounds with the alkylphenols being more preferred. The most preferred antioxidant is 4-methyl-2,6-di-t-butylphenol. The antioxidant is employed in an antioxidatively effective amount, for example, from about 100 parts by weight of antioxidant per million parts by weight of polyol (p.p.m.), and lower, to about 1500 p.p.m., and higher. Preferred concentrations of antioxidant can be found in the range of from about 250 p.p.m. to about 1000 p.p.m., with concentrations in the range of from about 400 p.p.m. to about 750 p.p.m. being more preferred.

The examples which follow illustrate the practice of the invention.

EXAMPLES 1–4

A series of flexible polyurethane foams were prepared by the one-shot technique from the following formulation.

| Component: | Parts by weight |
|---|---|
| Polyol [1] | 100.0 |
| Metal dialkyldithiocarbamate [2] | 0.1 |
| Silicone L-520 emulsifier [3] | 1.5 |
| Water | 4.0 |
| TMBDA [4] | 0.1 |
| Stannous octoate | 0.3 |
| Tolylene diisocyanate [5], 9% excess. | |

[1] The 1,2-epoxypropane adduct of glycerol, said adduct having a hydroxyl number of 52. The polyol also contained 550 parts by weight of 4-methyl-2,6-di-t-butylphenol per million parts by weight of polyol.
[2] As identified in Table I below.
[3] A polysiloxane-polyoxyalkylene block copolymer.
[4] N,N,N',N'-tetramethyl-1,3-butanediamine.
[5] An 80–20 mixture of 2,4- and 2,6-tolylene diisocyanate.

Table I below compares representative physical properties of a series of 4 flexible polyurethane foams. In Example 1, the foam formulation contained no metal dihydrocarbyldithiocarbamate, and in Examples 2–4, the polyols contained 1000 p.p.m. of the indicated metal dihydrocarbyldithiocarbamate. Various properties were determined upon "green" foam (i.e., tested within 1 hour of foaming), and after curing 24 hours under both dry and humid conditions. The 4″ ILD test measures indentation load deflection, and is determined by measuring the pounds necessary to compress a 50 square inch circular section of foam the indicated percentage of the original thickness. For example, the 4″ ILD 25% test measures the pounds necessary to compress a 50 square inch section of 4 inch thick foam to a thickness of 3 inches. The test is customarily run on a sample of foam measuring 13 inches by 13 inches by 4 inches. The guide factor is obtained by dividing the 4″ ILD 25% value by the density in pounds per cubic feet.

Table I, which follows, displays the comparison between foam properties tested "green" and after 24 hours cure.

Table I
FOAM PROPERTY CHANGE AFTER DRY AND HUMID CURE

| Example | 1 | | 2 | | 3 | | 4 | |
|---|---|---|---|---|---|---|---|---|
| Metal compound | Control—None | | Zinc dimethyldithio-carbamate | | Zinc diamyldithio-carbamate | | Cadium diamyldithio-carbamate | |
| Green (1 hour): | | | | | | | | |
| Density, pounds/ft.³ | 1.46 | | 1.44 | | 1.43 | | 1.43 | |
| 4″ ILD: | | | | | | | | |
| 25% | 35.5 | | 35.0 | | 35.4 | | 35.1 | |
| 65% | 65.9 | | 64.9 | | 63.6 | | 66.3 | |
| Guide factor | 24.3 | | 24.3 | | 24.7 | | 24.5 | |
| Cure conditions: | | | | | | | | |
| Rel. humidity, percent | 45 | 100 | 45 | 100 | 45 | 100 | 45 | 100 |
| Temperature, °F | 77 | 77 | 77 | 77 | 77 | 77 | 77 | 77 |
| Time, hr | 24 | 24 | 24 | 24 | 72 | 72 | 72 | 72 |
| Final: | | | | | | | | |
| Density, pounds/ft.³ | 1.48 | 1.48 | 1.49 | 1.49 | 1.45 | 1.47 | 1.47 | 1.46 |
| 4″ ILD: | | | | | | | | |
| 25% | 37.2 | 31.5 | 38.3 | 37.9 | 36.7 | 37.7 | 39.8 | 38.9 |
| 65% | 69.5 | 60.0 | 71.8 | 70.9 | 66.1 | 67.1 | 72.9 | 70.1 |
| Guide factor | 25.3 | 21.2 | 25.7 | 25.5 | 25.3 | 25.6 | 27.1 | 26.6 |
| 4″ ILD 65%: | | | | | | | | |
| Change during cure, percent | +5.5 | −9.0 | +10.6 | +9.2 | +3.9 | +5.5 | +10.0 | +5.7 |
| Change from green control | +5.5 | −9.0 | +9.0 | +7.6 | +0.3 | +1.8 | +10.6 | +6.4 |

From the above experiments, it is notable that the presence of the small amount of the metal dihydrocarbyldithiocarbamate not only negates the effect of humidity during cure, but, in many cases, also tends to give higher ILD values regardless of humidity.

EXAMPLES 6–17

In this series of experiments, the effects on physical properties of both dry and humid cure conditions were determined for flexible polyurethane foams prepared both without the metal dihydrocarbyldithiocarbamate additives, and with various concentrations of zinc diamyldithiocarbamate, lead diamyldithiocarbamate, or mixtures thereof. The foaming formulations employed were the same as that described in Examples 1–4, except that the concentration of the metal compound (p.p.m., based on polyol) was varied as shown in Table II below.

*Table II*

COMPARISON OF FOAM PROPERTIES BEFORE AND AFTER CURE

| | | Lead diamyldithiocarbamate | | | | | | | | |
|---|---|---|---|---|---|---|---|---|---|---|
| Example | 5 | 6 | | 7 | | 8 | | 9 | | |
| Concentration, p.p.m. | Control 0 | | 125 | | 250 | | 500 | | 750 | |
| Green (1 hour): | | | | | | | | | | |
| Density, pounds/ft.³ | 1.45 | | 1.43 | | 1.47 | | 1.45 | | 1.44 | |
| 4" ILD: | | | | | | | | | | |
| 25% | 36.0 | | 35.1 | | 39.0 | | 38.6 | | 38.4 | |
| 65% | 66.3 | | 64.7 | | 71.0 | | 71.0 | | 70.9 | |
| Guide factor | 24.8 | | 24.6 | | 26.5 | | 26.6 | | 26.7 | |
| Cure conditions: | | | | | | | | | | |
| Rel. humidity, percent | 50 | 100 | 50 | 100 | 50 | 100 | 50 | 100 | 50 | 100 |
| Temperature, °F | 77 | 77 | 77 | 77 | 77 | 77 | 77 | 77 | 77 | 77 |
| Time, hr | 24 | 24 | 24 | 24 | 24 | 24 | 24 | 24 | 24 | 24 |
| Final: | | | | | | | | | | |
| Density, pounds/ft.³ | 1.48 | 1.48 | 1.48 | 1.50 | 1.47 | 1.47 | 1.48 | 1.50 | 1.47 | 1.48 |
| 4" ILD: | | | | | | | | | | |
| 25% | 38.2 | 30.5 | 38.3 | 35.4 | 38.0 | 39.2 | 38.7 | 40.0 | 39.1 | 39.1 |
| 65% | 68.8 | 56.2 | 67.9 | 64.9 | 68.6 | 69.0 | 69.4 | 71.3 | 70.3 | 70.4 |
| Guide factor | 25.8 | 20.6 | 25.9 | 23.6 | 25.9 | 26.7 | 26.2 | 26.7 | 26.6 | 26.4 |
| 4" ILD 65%: Change from green control, percent | +3.8 | −18.0 | +1.8 | −2.1 | +3.5 | +4.1 | +4.7 | +7.5 | +6.0 | +6.2 |

| | | Zinc diamyldithiocarbamate | | | | | | | | |
|---|---|---|---|---|---|---|---|---|---|---|
| Example | 10 | | 11 | | 12 | | 13 | | 14 | |
| Concentration, p.p.m. | Control 0 | | 250 | | 500 | | 1000 | | Control 0 | |
| Green (1 hour): | | | | | | | | | | |
| Density, pounds/ft.³ | 1.45 | | 1.44 | | 1.46 | | 1.43 | | 1.46 | |
| 4" ILD: | | | | | | | | | | |
| 25% | 36.6 | | 39.0 | | 37.0 | | 36.4 | | 36.9 | |
| 65% | 67.2 | | 71.2 | | 68.3 | | 66.9 | | 67.0 | |
| Guide factor | 25.4 | | 27.1 | | 25.3 | | 25.5 | | 25.3 | |
| Cure conditions: | | | | | | | | | | |
| Rel. humidity, percent | 45 | 100 | 45 | 100 | 45 | 100 | 45 | 100 | 55 | 100 |
| Temperature, °F | 76 | 76 | 76 | 76 | 76 | 76 | 76 | 76 | 77 | 77 |
| Time, hr | 24 | 24 | 24 | 24 | 24 | 24 | 24 | 24 | 24 | 24 |
| Final: | | | | | | | | | | |
| Density, pounds/ft.³ | 1.50 | 1.48 | 1.46 | 1.46 | 1.46 | 1.45 | 1.47 | 1.45 | 1.48 | 1.47 |
| 4" ILD: | | | | | | | | | | |
| 25% | 39.0 | 34.0 | 40.0 | 38.6 | 38.9 | 37.5 | 38.5 | 38.1 | 39.0 | 33.5 |
| 65% | 70.5 | 63.2 | 70.9 | 68.5 | 68.2 | 67.4 | 68.5 | 68.0 | 70.0 | 64.0 |
| Guide factor | 26.0 | 23.0 | 27.4 | 26.4 | 26.6 | 25.9 | 26.2 | 26.3 | 26.4 | 22.8 |
| 4" ILD 65%: Change from green control, percent | +4.9 | −5.9 | +5.5 | +1.9 | +1.5 | +0.3 | +1.9 | +1.2 | +4.5 | −4.5 |

*Table II—Continued*

COMPARISON OF FOAM PROPERTIES BEFORE AND AFTER CURE

| | Lead Diamyldithiocarbamate plus Zinc Diamyldithiocarbamate | | | | | |
|---|---|---|---|---|---|---|
| Example | 15 | | 16 | | 17 | |
| Concentration, p.p.m. | Pb 250 + Zn 125 | | Pb 250 + Zn 250 | | Pb 250 + Zn 500 | |
| Green (1 hour) | | | | | | |
| Density, pounds/ft.³ | 1.44 | | 1.44 | | 1.46 | |
| 4" ILD: | | | | | | |
| 25% | 38.8 | | 38.0 | | 38.6 | |
| 65% | 69.6 | | 69.0 | | 69.0 | |
| Guide factor | 27.0 | | 26.4 | | 26.5 | |
| Cure conditions: | | | | | | |
| Rel. humidity, percent | 55 | 100 | 55 | 100 | 55 | 100 |
| Temperature, °F | 77 | 77 | 77 | 77 | 77 | 77 |
| Time, hr | 24 | 24 | 24 | 24 | 24 | 24 |
| Final: | | | | | | |
| Density, pounds/ft.³ | 1.45 | 1.47 | 1.45 | 1.47 | 1.45 | 1.46 |
| 4" ILD: | | | | | | |
| 25% | 40.3 | 40.1 | 38.3 | 39.4 | 38.8 | 40.3 |
| 65% | 72.2 | 72.2 | 69.7 | 72.0 | 70.0 | 72.7 |
| Guide factor | 27.8 | 27.3 | 26.4 | 26.8 | 26.8 | 27.6 |
| 4" ILD 65%: Change from green control, percent | +7.8 | +7.8 | +4.0 | +7.5 | +4.5 | +8.5 |

The foregoing examples serve to illustrate the practice of the invention. Variations can be made without departing from the spirit and scope of the invention.

What is claimed is:

1. In a process for the production of polyurethane foams wherein a polyether polyol is reacted with an organic polyisocyanate in the presence of a blowing agent, the improvement which comprises incorporating in said polyether polyol from about 100 parts by weight to about 1500 parts by weight per million parts by weight of said polyether polyol of lead dialkyldithiocarbamate, the lead being in the divalent state.

2. The improvement of claim 1 wherein said lead dialkyldithiocarbamate is lead diamyldithiocarbamate.

3. The polyurethane foam produced by the process of claim 1.

References Cited by the Examiner

UNITED STATES PATENTS 2,915,496  12/1959  Swart et al. _____ 260—2.5
2,942,033   6/1960  Leis _____ 260—611.5
3,006,870  10/1961  Steinfatt et al. _____ 260—2.5

FOREIGN PATENTS 842,271  7/1960  Great Britain.

LEON J. BERCOVITZ, *Primary Examiner.*